(12) United States Patent
Sadanowicz et al.

(10) Patent No.: US 6,718,634 B1
(45) Date of Patent: Apr. 13, 2004

(54) METHOD OF SECURING A BEARING AND HUB TO A KNUCKLE

(75) Inventors: David Thomas Sadanowicz, Canton, MI (US); Robert Edward Sierminski, Farmington Hills, MI (US); Jeffery D. Pontius, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 134 days.

(21) Appl. No.: 10/080,967

(22) Filed: Feb. 22, 2002

(51) Int. Cl.⁷ .................................................. B21K 1/40
(52) U.S. Cl. .............................. 29/894.361; 29/898.07; 29/898.09; 301/105.1; 384/589
(58) Field of Search ........................ 29/898.07, 898.09, 29/894.361, 894.362, 446, 453, 510, 511, 469; 301/105.1; 384/589, 544

(56) References Cited

U.S. PATENT DOCUMENTS

| | | | | |
|---|---|---|---|---|
| 2,956,632 A | * | 10/1960 | Forbush et al. | 180/385 |
| 6,112,411 A | * | 9/2000 | Rutter | 29/898.07 |
| 6,212,981 B1 | * | 4/2001 | Brinker et al. | 82/1.11 |
| 6,364,426 B1 | * | 4/2002 | Horne et al. | 301/105.1 |
| 6,450,584 B2 | * | 9/2002 | Brinker et al. | 301/105.1 |
| 6,485,109 B2 | * | 11/2002 | Brinker et al. | 301/105.1 |
| 6,634,266 B2 | * | 10/2003 | Brinker et al. | 82/168 |
| 6,640,438 B2 | * | 11/2003 | Webb et al. | 29/894.362 |
| 6,644,861 B2 | * | 11/2003 | Hacker et al. | 384/589 |

* cited by examiner

Primary Examiner—Peter Vo
Assistant Examiner—Essama Omgba
(74) Attorney, Agent, or Firm—Leo H. McCormick, Jr.; Warren Comstock

(57) ABSTRACT

A method of attaching a bearing (216) and hub (214) to a knuckle (212) in a corner assembly (220) of a vehicle to prevent the introduction of lateral moments into a plurality of rollers (232,234,232',234') retained in the bearing (216). The bearing (216) has an inner race (222) and an outer race (226) with the plurality of rollers (232,234,232',234') being retained between an outer race (226) and an inner race (222). The hub (214) has a cylindrical body with a flange (220) located adjacent a first end (219) and a mounting surface (224) located adjacent a second end (213). The flange (220) has a plurality of axial openings (250,250' . . . 250'') that are spaced in an arc with respect to an axis of the cylindrical body. After the inner race (222) is located on the mounting surface (224), the inner race (222) is fixed to the cylindrical body. Thereafter, hub (214) is placed on a tool (242) such that a plurality of pins (248,248' . . . 248'') on the tool (242) extend through the plurality of openings (250,250' . . . 250'') in the flange (220) and engage the outer race (226) of the bearing (216). The tool (242) is aligned with an opening (240) in the knuckle (212) and a force is only applied to the outer race (226) to push the bearing (216) into opening (240) and position the hub (216) in knuckle (212).

10 Claims, 4 Drawing Sheets

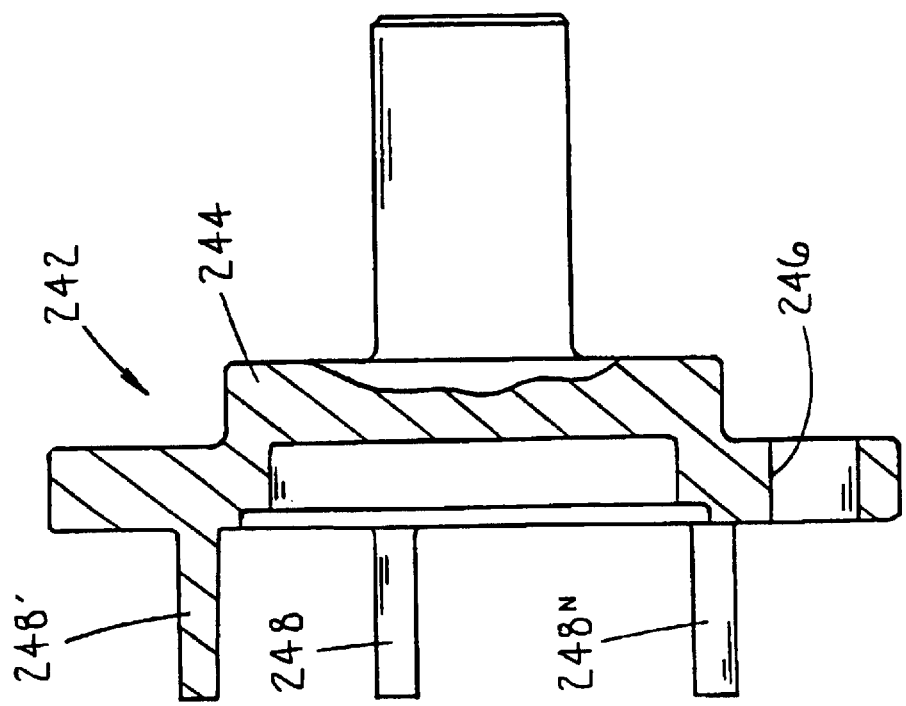
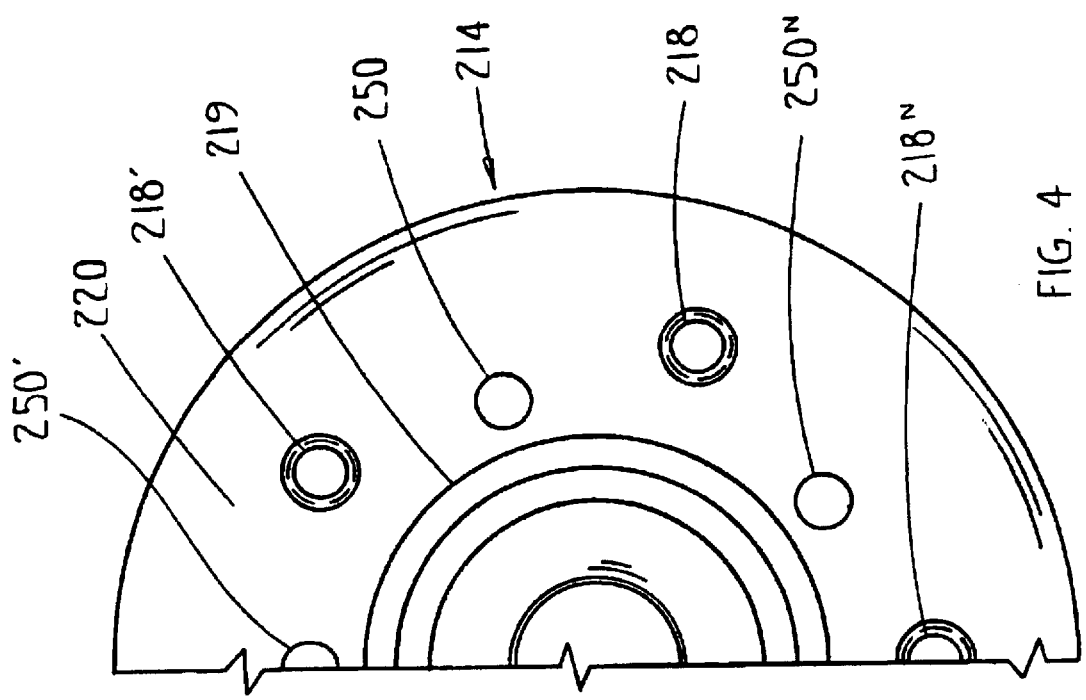

METHOD OF SECURING A BEARING AND HUB TO A KNUCKLE

This invention relates to a method of securing a bearing and hub to a knuckle member of a corner assembly for a vehicle.

BACKGROUND OF THE INVENTION

In a vehicle it is common to mount a hub and bearing to a corner assembly of a vehicle. A wheel for the vehicle is thereafter attached to the hub. The bearing has an outer race and an inner race for retention of a plurality of rollers. The outer race has a flange that is bolted to the corner assembly while the inner race is fixed on the hub by a retention device. The retention device is normally screwed on to the hub with a predetermined torque until a preload force exists between the inner race and a shoulder on the hub. Unfortunately, if the preload is not correct axial run out or binding may be introduced into the bearing. While U.S. Pat. No. 5,984,422 discloses structure whereby the introduction of axial run out is reduced. It is known that the hub and bearing attachment to a corner assembly can be simplified by press fitting the bearing to the corner assembly and thereby eliminate bolts of a type disclosed in U.S. Pat. No. 5,984,422. Unfortunately, in pressing the hub with the bearing attached thereto into the corner assembly, it is possible to introduce lateral stress forces into the bearing as the pressing force is sequentially transmitted from the hub to the inner race to the plurality of rollers and finally to the outer race. The introduction of such lateral forces could adversely effect the free rotation of the hub in the bearing.

SUMMARY OF THE INVENTION

A primary object of the present invention is to provide a method of pressing a bearing and hub onto a knuckle without the introduction of lateral forces that could effect the rotation of the hub in the bearing.

According to this invention, a bearing and hub assembly is pressed into a knuckle in a corner assembly of a vehicle without the introduction of lateral forces that could adversely effect a plurality of rollers retained in the bearing through the following steps:

selecting a bearing having an inner race and an outer race with a plurality of rollers retained there between from a supply;

selecting a hub having a cylindrical body with an axial bore that extends from a first end to a second end a supply, the cylindrical body has an outwardly extending flange that extends from the first end and a plurality of axial openings in the flange that are spaced in an arc with respect to an axis of the cylindrical body;

placing the inner race of the bearing on a peripheral mounting surface of the hub that extends from the second end to a shoulder adjacent the flange;

applying a force to the second end of the cylindrical body to position the inner race against the shoulder;

placing the hub on a tool such that a plurality of pins on the tool extend through the plurality of openings in the flange and engage the outer race of the bearing;

aligning the tool with an opening in the knuckle;

moving the tool toward the opening in the knuckle; and applying a force to the tool to push on the outer race and move the hub and bearing into the opening of the knuckle such that the entire force is exclusively applied to the outer race in securing the hub and bearing to the corner assembly.

An advantage of this method resides in the fact that lateral forces are not transmitted through a plurality of rollers in a bearing when a bearing is pushed into a knuckle.

A still further advantage of this invention is in the elimination of a need for bolts to secure an outer race of a bearing to a knuckle.

BRIEF DESCRIPTION OF THE DRAWINGS

FIG. 4 is a partial end view of the hub of FIG. 3;

FIG. 5 is a sectional view of the tool utilized in securing the bearing and hub assembly to the knuckle in FIG. 3.

DETAILED DESCRIPTION

Figure 2:
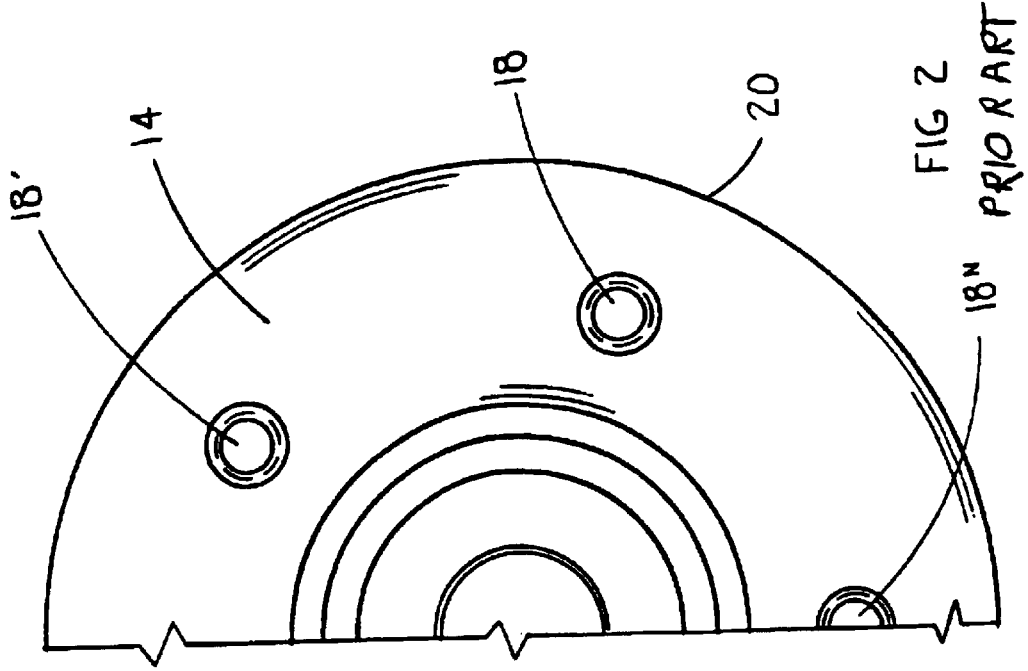
FIG. 2 is a partial end view of the hub of FIG. 1.
Figure 1:
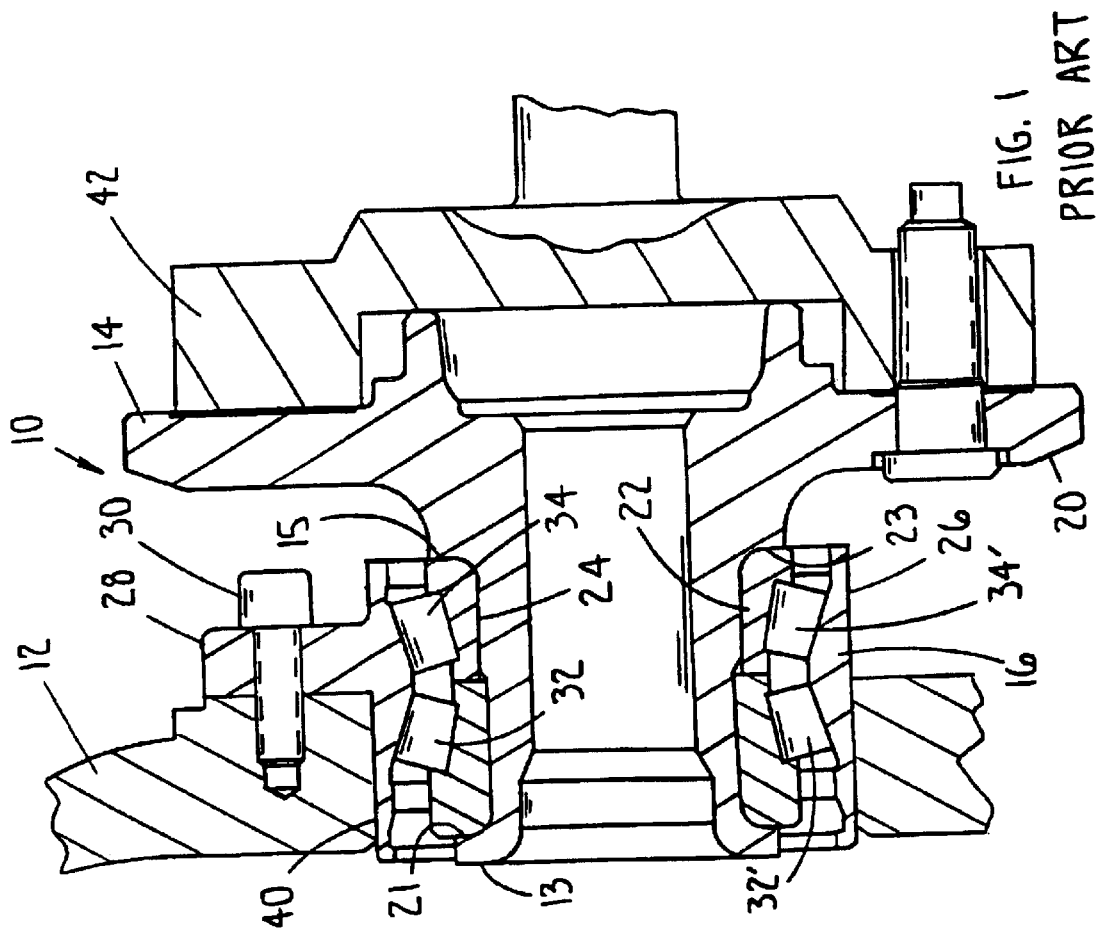
FIG. 1 is a sectional view of a bearing and hub secured to a corner assembly of a vehicle as known in the prior art.

The corner assembly 10 illustrated in FIG. 1 for use in a vehicle is known in the prior art and includes knuckle 12 with a hub 14 and bearing 16 attached thereto. The hub 14 has a flange 20 plurality of studs 18,18 . . . 18″, see FIG. 2, on which a rim of a wheel of a vehicle is located. The bearing 16 has an inner race 22 that is located on a mounting surface 24 of the hub 14 and an outer race 26 that has a plurality of ears 28, only one of which is shown, that is bolted to knuckle 12 by bolts 30. A plurality of rollers 32,34,32',34' are located between the inner race 22 and outer race 26 and the inner race 22 is positioned on mounting surface 24 by end 13 being rolled over into engagement with end 21 of the inner race 22 to urge end 23 on the inner race into engagement with shoulder 15 on hub 14 in a manner as disclosed in U.S. Pat. No. 5,984,422. This structure functions in an adequate manner and has been accepted for use on many vehicles.

In an effort to reduce the overall weight of a vehicle, it was been determined that the plurality of ears 28 on the outer race 26 and bolts 30 could be eliminated in attaching a bearing 16 and hub 14 to a knuckle by being pressed fitting into opening 40 in knuckle 12. In press fitting the bearing 16 and hub 14 into opening 40, a tool 42 is aligned on studs 18,18'. . . 18″ on flange 20 and a force is applied to push the bearing 16 and hub 14 into opening 40 of knuckle 12. The force applied to the tool 42 to move the outer race 26 into opening 40 is transmitted by way of shoulder 15 acting on end 23 of the inner race 22, the plurality of rollers 32,34, 32',34' and hence into the outer race 26. Unfortunately it is possible to introduce a lateral or twisting moment into the bearing 16 which may later adversely effect runout of the bearing 16.

Figure 3:
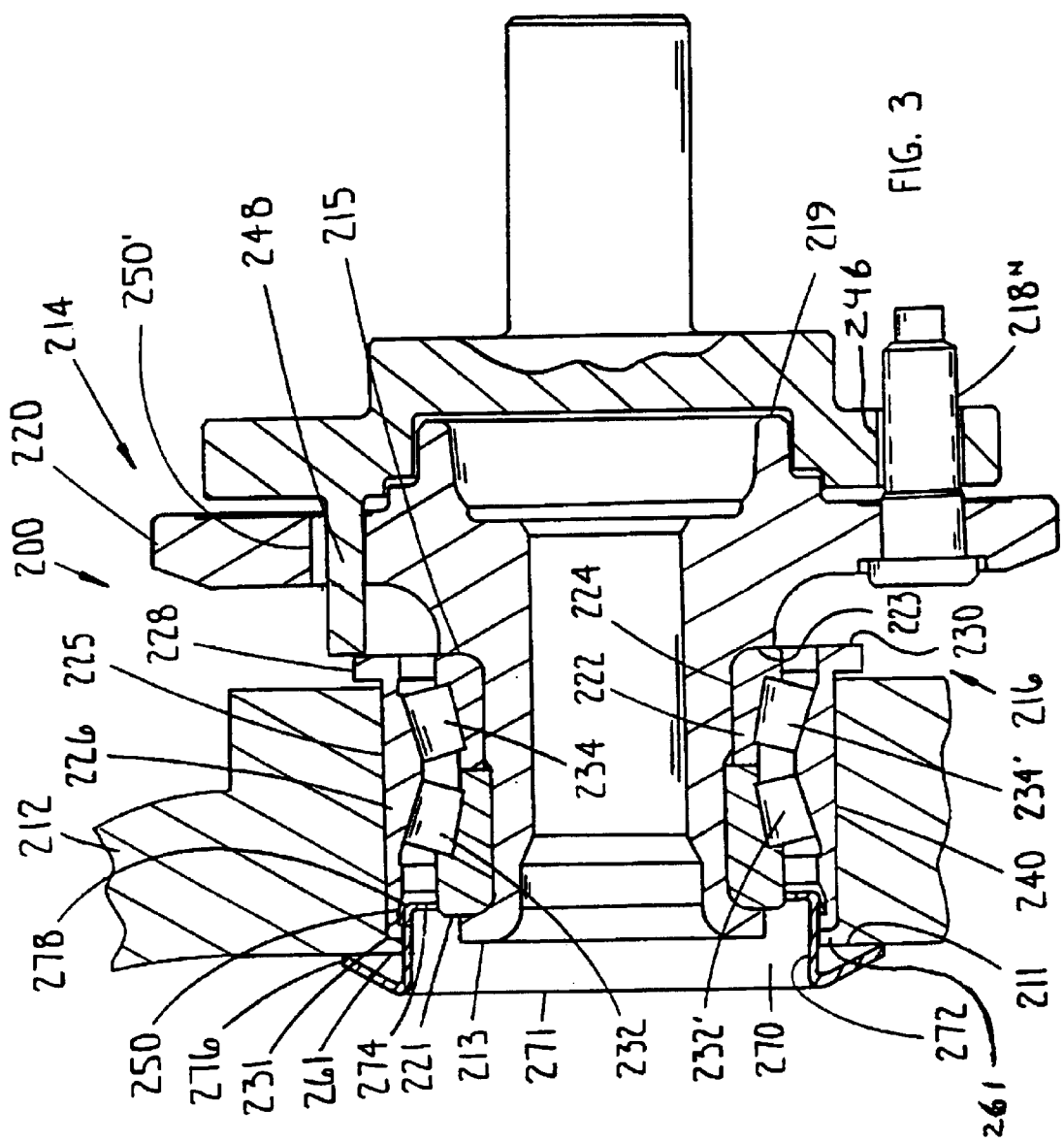
FIG. 3 is a sectional view of a bearing and hub secured to a knuckle of a corner assembly of a vehicle in accordance with the method of the present invention.

The present invention for a corner assembly 200 as illustrated in FIG. 3 overcomes the problem of adversely introducing a lateral force into a bearing 216 for a hub 214. The bearing 216 has an inner race 222 that is located on a mounting surface 224 of the hub 214 and an outer race 226 with a generally cylindrical peripheral surface 225 that extends from a flange 228 on a first end 230 to a second end 231. The outer race 226 has an internal groove 250 adjacent the second end 231 that receives a fastener 270. The outer race 226 has first and second tapered surfaces are aligned with complimentary first and second tapered surfaces on the inner race 222 that receive and hold a plurality of rollers 232,234,232', 234' (only four of which are shown). The inner race 222 is illustrated as being retained on mounting surface 224 by having a portion of end 213 being rolled over into engagement with end 221 of the inner race 222 to urge end 223 on the inner race 222 into engagement with shoulder 215 on hub 214 in a manner similar to the retention means as disclosed in U.S. Pat. No. 5,984,422 for bearing 16 but for some applications a threaded nut or snap ring retention may be utilized. The hub 214 has cylindrical body with a flange 220 on the first end 219 with a plurality of studs 218,218' ... 218" located in a first arc with respect to an axis of the cylindrical body of hub 214 and a plurality of concentric openings 250,250' ... 250" located in a second arc with respect to the axis of its cylindrical body, see FIGS. 4 and 5.

The fastener 270 has a cylindrical body 272 with an inward extending lip 274 on a first end and an outward extending lip 276 on a second end. A plurality of tabs 278 (only one of which is shown) extend from adjacent the first end and are designed to be located in groove 250 of the outer race 226. The inward extending lip 274 of fastener 270 has a length such that it may engages the surface adjacent end 221 of the inner race 222 to prevent the communication of contamination to the plurality of rollers 232,234,232',234'. A primary function of the fastener 270 is to retain the hub 214 and bearing 216 in the knuckle 212 should the press fit fail.

The tool 242 for pushing the hub 214 into opening 240 in knuckle 212 is shown in FIGS. 3 and 5 has a generally circular base 244 with an plurality of openings 246 (only one of which is shown) located in a same arcuate location with respect to its axis as studs 218,218' ... 218' and a plurality of pins 248,248' ... 248' that extend from the circular base 244 in a same arc location with respect to its axis as openings 250,250' ... 250' in hub 214.

Mode of Operation of the Invention

The assembly of a corner assembly 200 according to the present invention is achieved through the following steps.

a bearing 216 having a plurality of rollers 232,234,232', 234' located between an inner race 222 and an outer race 226 is selected from a supply source;

a hub 214 having a cylindrical body with an axial bore that extends from a first end 219 to a second end 213, an outwardly extending flange 220 adjacent the first end 219 and a groove 250 adjacent the second end 213 is selected from a source. The flange 220 has a plurality of axial openings 250,250' ... 250" that are spaced in an arc with respect to its axis while the cylindrical body has a peripheral mounting surface 224 that extends from the second end 213 to a shoulder 215 adjacent the flange 220;

the bearing 216 is placed on the hub 214 such that the inner race 222 is located on mounting surface 224;

a force is applied to the second end 213 of the cylindrical body to roll at least a portion of end 213 of hub 214 into engagement with end 221 on the inner race 222 and bring end 223 of the inner race 222 into engagement with shoulder 215 to secure the bearing 216 to the hub 214;

thereafter, the hub 214 with the bearing 216 located on its peripheral surface 224 is placed on a tool 242 such that a plurality of pins 248, 248' ... 248" on the base 244 extend through the plurality of openings 250,250'. . . 250" in flange 220 of the hub 214 and engage flange 228 on the outer race 226 of bearing 216;

the tool 242 is aligned with opening 240 in knuckle 212 and moved toward opening 240 in the knuckle 212 to initially bring lip 276 on fastener 270 that was previously located in groove 250 of hub 214 into engagement with opening 240; and a force is thereafter applied to tool 242 and directed into the outer race 226 to push the outer race 226 into opening 240. The force continues to be applied to the outer race 226 until end 231 engages lip 261 on knuckle 212. It should be noted that at no time is the force that is applied to flange 228 to press the outer race 226 of bearing 216 into opening 240 of knuckle 212 carried through hub 214 and as a result no lateral moment or force is introduced into the rollers 232,234,232',234'.

Once end 231 engages lip 261 of knuckle 212 the press joint is completed, however to assure that the hub 214 and bearing 216 are retained in knuckle 212 should the press fit connection fail for any reason, a fastener 270 fixes the outer race 226 in opening 240 of knuckle 212.

The fastener 270 is selected from a source and is designed to be snapped on the knuckle 212 to holding the outer race 226 in opening 240. In snapping the fastener 270 onto the outer race 226, the fastener 270 is aligned with the opening surrounding lip 261 and a force is applied to face 271 to push fastener 270 toward the outer race 226 and move the inward extending flange 274 toward end 231. As the inward extending flange 274 moves, tabs 278 that extend from the cylindrical body 272 flex inward to move over the inner surface of lip 261 and when aligned with groove 250 the tabs 278 snap out into groove 250 while at the same time the outward extending flange 276 engages surface 211 to hold end 231 against the face of lip 261 to hold the outer race 226 in opening 240 such that bearing 216 is aligned and retained in opening 240.

Figure 6:
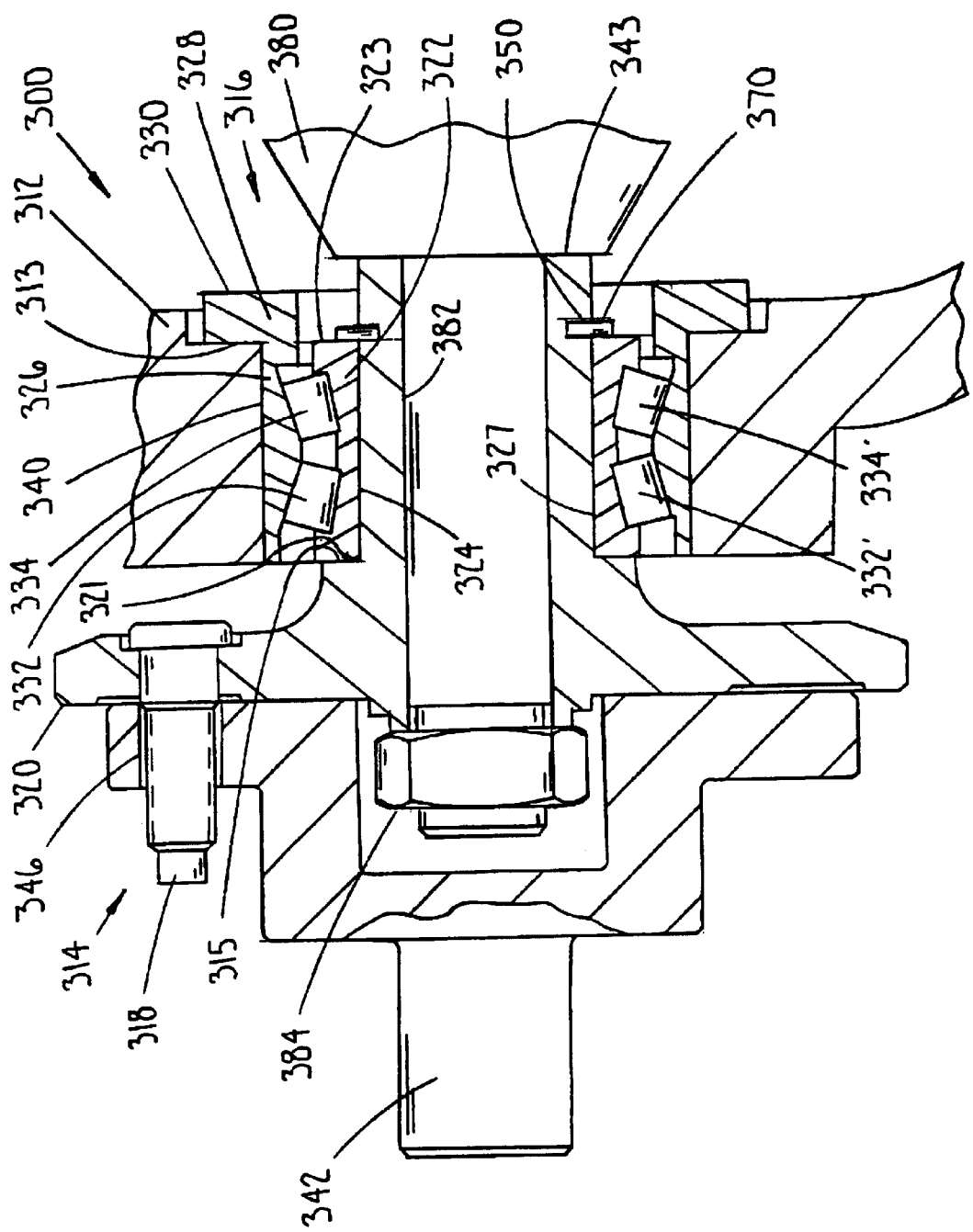
FIG. 6 is a sectional view of another embodiment of the invention.

FIG. 6 illustrates another embodiment of a corner assembly 300. The structural components of corner assembly 300 are similar to those of corner assembly 200 and as a result only components that are structurally different are described in more detail. As with the corner assembly 200 described above, a hub 314 and bearing 316 for the corner assembly 300 are also pushed into an opening 340 of a knuckle 312 without the introduction of lateral forces that could thereafter adversely effect a plurality of rollers 332,334,332',334' (only four of which are illustrated) retained between an outer race 326 and inner race 322. In steps in the assembly of the corner assembly 300 is progressive in that a first force is applied to a first end 330 of the outer race 326 to move the outer race 326 into opening 340 of knuckle 312. The first force as applied to the flange 328 continues until the first end 330 engages a face 313 that surrounds opening 340 on the knuckle 312. It should be noted that all of the first force that is required to push bearing 316 into knuckle 312 is only carried through the outer race 326. Once the bearing 316 is located in opening 340 it is ready to receive the hub 314. The hub 314 having been placed on a tool 342 such that a plurality of mounting studs 318 (only one of which is shown) on hub 314 are correspondingly located in openings 346 (only one of which is shown) on a tool 342. Thereafter, the tool 342 is aligned with an axial bore 327 that extends from the first end 321 to a second end 223 of the inner race 322. A second force is thereafter applied to tool 342 that acts on flange 320 of hub 314 to push the cylindrical body of hub 314 into axial bore 327. This second force continues until shoulder 315 engages end 321 of the inner race 322 at which time the peripheral surface 324 on hub 314 will also be aligned within the inner race 322 and opening 340 of knuckle 312. After shoulder 315 engages end 321, a snap ring 370 is inserted into a groove 350 located on hub 314 adjacent end 343 to maintain this space relationship between the hub 314, bearing 316 and knuckle 312. Later, an axle 380 is inserted into bore 382 of hub 314 and a nut 384 is attached to the end thereof to complete the assembly of corner assembly 300 for a vehicle.

We claim:

1. A method of pressing a bearing and hub to a knuckle in a corner assembly of a vehicle comprising the steps of:

selecting a bearing from a supply, said bearing having an inner race with a plurality of rollers retained between said inner race and said outer race;

selecting a hub from a source, said hub having a cylindrical body with an axial bore that extends from a first end to a second end, said cylindrical body having an outwardly extending first flange adjacent said first end, said first flange having a plurality of axial openings that are spaced in an arc with respect to an axis of said cylindrical body, said cylindrical body having a peripheral mounting surface that extends from said second end to a shoulder adjacent said flange;

placing said bearing on said hub such that said inner race is located on said mounting surface;

applying a force to said second end of said cylindrical body to bring and maintain said inner race against said shoulder;

placing said hub with the bearing located on its peripheral surface on a tool, said tool having a plurality of pins that extend through said plurality of openings in said first flange and engage said outer race of said bearing;

aligning said tool with an opening in said knuckle;

moving said tool toward said opening in said knuckle; and applying a force to said tool to only push on said outer race to move said hub and bearing Into said opening of said knuckle without the introduction of a lateral moment into said plurality of rollers.

2. The method as recited in claim 1 wherein said outer race is characterized by a second flange and in the step of pushing said hub toward said knuckle, said pins of said tool engage said second flange on said outer race.

3. The method as recited in claim 2 wherein said force utilized in the step of pushing said hub toward said knuckle is exclusively carried through said outer race to position said hub in a space relationship with said knuckle.

4. The method as recited in claim 2 wherein said step of pushing said hub toward said knuckle continues until said second end of said outer race engages a lip on said knuckle to align the roller bearings within the opening of said knuckle.

5. The method as recited in claim 4 wherein said outer race is further characterized by a groove for receiving a fastener, said fastener being brought into engagement with said knuckle after said second end of said outer race engages said knuckle to assist in retaining said hub in said knuckle.

6. The method as recited in claim 4 wherein said outer race is further characterized by a fastener member being located on an end thereof to secure said hub and bearing in said knuckle.

7. The corner assembly produced by the method as recited in claim 6.

8. The method as recited in claim 4 further including the step of pushing a fastener into said groove in said outer race and into engagement with a surface on the knuckle to assist in retaining said outer race in said knuckle.

9. A method of pressing a bearing and hub into a knuckle of a corner assembly of a vehicle without the introduction of lateral forces into a plurality of rollers retained in the bearing, comprising the steps of:

selecting a bearing from a supply, said bearing having a plurality of rollers retained between an inner race and an outer race, said outer race having a first flange located on a first end thereof, said inner race having an first axial bore that extends from a first end to a second end;

placing said bearing on a first tool;

aligning said first tool with an opening in said knuckle;

applying a first force to move said first tool and initially bring said outer race into engagement with said knuckle and thereafter push on said first flange to position said bearing in said opening;

selecting a hub from a source, said hub having a cylindrical body with a second axial bore that extends from a first end to a second end, said cylindrical body having an outwardly extending second flange that extends from a location adjacent said first end, said second flange having a plurality of studs that are spaced in an arc with respect to an axis of said cylindrical body, said cylindrical body having a peripheral mounting surface that extends from said second end to a shoulder adjacent said second flange, said cylindrical body having a groove adjacent said second end;

placing said hub on a second tool;

aligning said second tool with said first axial bore on said inner race and thereafter applying a force to push said cylindrical body of said hub into said first axial bore until said shoulder thereon engages said second end of said inner race and said peripheral mounting surface is aligned within said inner race; and placing a snap ring in said groove on said peripheral surface of said hub to assist in retaining said peripheral mounting surface in a fixed position within said first axial bore of said inner race.

10. A method of pressing a bearing and hub to a knuckle in a corner assembly of a vehicle comprising the steps of:

selecting a bearing from a supply, said bearing having an inner race and an outer race with a plurality of rollers retained between said inner race and said outer race;

selecting a hub from a source, said hub having a cylindrical body with an axial bore that extends from a first end to a second end, said cylindrical body having an outwardly extending flange adjacent said first end, said flange having a plurality of axial openings that are spaced in an arc with respect to the axis of said cylindrical body, said cylindrical body having a peripheral mounting surface that extends from said second end to a shoulder adjacent said flange;

placing said bearing on said hub such that said inner race is located on said mounting surface;

securing a fastener to said second end of said cylindrical body to position said inner race against said shoulder;

placing said hub with the bearing located on its peripheral surface on a tool, said tool having a plurality of pins that extend through said plurality of openings in said first flange and engage said outer race of said bearing;

aligning said tool with an opening in said knuckle;

moving said tool toward said opening in said knuckle; and applying a force to said tool to only push on said outer race to move said hub and bearing into said opening of said knuckle without the introduction of a lateral moment into said plurality of rollers.

* * * * *